(12) United States Patent
Iwashita et al.

(10) Patent No.: US 6,310,457 B1
(45) Date of Patent: Oct. 30, 2001

(54) SERVOMOTOR CONTROLLER

(75) Inventors: Yasusuke Iwashita; Tadashi Okita, both of Minamitsuru-gun (JP)

(73) Assignee: Fanuc Ltd., Minamitsuru-gun (JP)

( * ) Notice: Subject to any disclaimer, the term of this patent is extended or adjusted under 35 U.S.C. 154(b) by 0 days.

(21) Appl. No.: 09/488,017

(22) Filed: Jan. 20, 2000

(30) Foreign Application Priority Data

Jan. 22, 1999 (JP) .................................................. 11-014095

(51) Int. Cl.$^7$ .................................................. G05B 19/25
(52) U.S. Cl. .................... 318/570; 318/568.22; 318/569; 318/572; 364/474.23
(58) Field of Search ..................... 318/560–618; 706/12; 364/468.21, 474.22, 474.26, 474.23, 474.25, 474.14

(56) References Cited

U.S. PATENT DOCUMENTS

| 4,374,350 | * | 2/1983 | Kohzai et al. . |
| 4,501,999 | * | 2/1985 | Kohzai et al. . |
| 4,647,826 | | 3/1987 | Ota . |
| 4,810,941 | | 3/1989 | Ohishi et al. . |
| 4,970,449 | | 11/1990 | Kawamura et al. . |
| 5,079,490 | * | 1/1992 | Kita et al. . |
| 5,157,597 | * | 10/1992 | Iwashita . |
| 5,519,297 | * | 5/1996 | Kono et al. . |
| 5,751,585 | | 5/1998 | Cutler et al. . |

FOREIGN PATENT DOCUMENTS

| 0 421 176 B1 | 4/1991 | (EP) . |
| 0 442 540 A2 | 8/1991 | (EP) . |
| 3-121738 | 5/1991 | (JP) . |

* cited by examiner

*Primary Examiner*—Paul Ip
(74) *Attorney, Agent, or Firm*—Staas & Halsey LLP (57) ABSTRACT

When contents of a program for machining to be executed by a servomotor indicate a cutting mode, a current command is generated by performing speed loop processing by using a speed loop gain for cutting mode, and moreover, a voltage command to a servo amplifier is generated by performing proportional-plus-integral (PI) current loop processing in accordance with the generated current command. On the other hand, when the contents of the machining program indicate a positioning mode, a current command is generated by performing speed loop processing by using a speed loop gain for positioning mode, and moreover, a voltage command to the servo amplifier is generated by performing integral-plus-proportional (I-P) current loop processing in accordance with the generated current command.

6 Claims, 4 Drawing Sheets

SERVOMOTOR CONTROLLER

BACKGROUND OF THE INVENTION

1. Field of the Invention

The present invention relates to a controller of a servomotor used as a driving source of various industrial machines including a machine tool, wire electric-discharge machine, and industrial robot.

2. Description of the Prior Art

Figure 6:
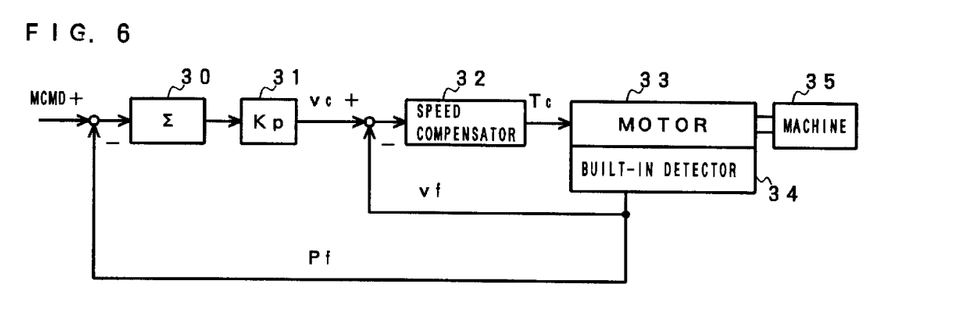
FIG. 6 is a block diagram of control to be executed by a conventional servomotor controller.

A controller of a servomotor having been used so far will be described below by referring to a block diagram in FIG. 6.

A movement command MCMD supplied every position/speed loop processing cycle is input to an error counter 30 from a controller (not illustrated) such as a numerical controller or the like. The error counter 30 obtains a positional deviation by subtracting a positional feedback value Pf sent from a position/speed detector 34 built in a servomotor 33 (or position/speed detector set to a machine to be driven by the servomotor 33) every position/speed loop processing cycle from a movement command MCMD.

A speed command vc every position/speed loop processing cycle is obtained by multiplying the positional deviation by a positional loop gain Kp (block 31). Then, a speed deviation (=vc−vf) is obtained by subtracting a speed feedback value vf fed back from the position/speed detector 34 from the speed command vc. Then, a torque command (current command) Tc is obtained by performing proportional-integral processing by a speed compensator 32 in accordance with the speed deviation and moreover, current loop processing is performed to drive the servomotor 33 and movable parts of a machine 35.

The above described speed compensator 32 comprises an integral compensation term and a proportional compensation term. The integral compensation term has a speed-loop integral gain and the proportional compensation term has a speed-loop proportional gain. Moreover, in general, the above described servomotor is controlled by a software servo using a digital processor.

Herein, the above described speed-loop integral gain and proportional gain of the speed compensator 32 are set by parameters.

These set values are determined while checking the stability of a servo system.

To improve a control performance, it is necessary to raise a speed loop processing gain and moreover, a current loop processing gain. However, when the torque command Tc is saturated due to rapid traverse of a movable part, that is, when a machine is driven up to an acceleration/deceleration limit at a short acceleration/deceleration time constant, speed loop processing tends to be unstable. Therefore, set values of a speed loop gain and a current loop gain have been determined so far so that speed loop processing does not become unstable even if a machine is driven and controlled at a short acceleration/deceleration time constant (that is, at a large acceleration). As a result, the speed loop gain and current loop gain are kept relatively low and therefore, it is limited to improve the control performance.

As described above, a speed loop gain (and also, a current loop gain) is determined so as to prevent speed loop processing from becoming unstable due to saturation of a torque command or the like. Therefore, even when a speed loop gain is kept in an area having full scope in which a torque command is not saturated (that is, even when a determined gain can be further raised), control is continued with the gain determined low. Therefore, the control performance is prevented from being improved.

Particularly, in case of a machine tool for performing cutting by driving a servomotor, the cutting accuracy is controlled by a speed loop gain. Therefore, the fact that a speed loop gain cannot be sufficiently raised results in the fact that the cutting accuracy cannot be sufficiently raised.

Changing speed loop gains in accordance with an operation mode in a controller is disclosed in itself in Japanese Patent Application Laid-Open No. 3-121738. The controller controls the rotation of a spindle of a machine tool through a motor and the machine tool is operated in either of a turning operation mode for turning a rotating workpiece and a position control mode (C-axis operation mode) for controlling a rotational position of the spindle. When the turning operation mode is set by control mode change means, lower position loop gain and speed loop gain are used. On the other hand, when the turning operation mode is changed to the position control mode while turning is not performed, a higher loop gain and speed loop gain are used for acquiring the response characteristic suitable for cutting in the C-axis operation.

In case of the above controller, however, a motor for driving a machine tool is a spindle motor, not a servomotor, and the controller is not provided aiming at accomplishing a high accuracy by carrying out gain changing. Further, it is not suggested to change a current loop processing configuration to a proper configuration in accordance with the case of a turning operation mode or a positioning operation mode.

As described above, a conventional controller cannot simultaneously satisfy improvement of a control performance in servomotor control and stable control in an area in which a controlled variable is saturated.

OBJECTS AND SUMMARY OF THE INVENTION

It is an object of the present invention to provide a controller of a servomotor capable of improving the control performance and obtaining stable control even in an area in which a controlled variable is saturated.

To attain the above described object, a servomotor controller according to the present invention comprises operation mode judging means for judging whether the contents of a command indicate a cutting mode or a positioning mode, and speed loop gain storing means for storing a speed loop gain for cutting mode and a speed loop gain for positioning mode. And control is performed by selecting either of the speed loop gain for cutting mode or the loop gain for positioning mode stored in the speed loop gain storing means in accordance with a judgment result of the operation mode judging means.

Preferably, the servomotor controller according to the present invention further comprises current loop gain storing means for storing a current loop gain for cutting mode and a current loop gain for positioning mode. And control is performed by selecting either of the current loop gain for cutting mode or the current loop gain for positioning mode stored in the current loop gain storing means in accordance with a judgment result of the operation mode judging means.

Preferably, the servomotor controller according to the present invention further comprises a first current control configuration for performing proportional-plus-integral type current loop processing in accordance with a current command generated through speed loop processing and a feedback current fed back from a servo amplifier, and a second current control configuration for performing integral-plusproportional type current loop processing in accordance with a current command generated through speed loop processing and a feedback current fed back from the servo amplifier. And switching from the first to second or the second to the first current control configuration is performed in accordance with a judgment result of the operation mode judging means.

More preferably, in the servomotor controller according to the present invention, when the operation mode judging means judges that contents of a command indicate a cutting mode, the speed loop gain changing means performs changeover of a speed loop gain to the speed loop gain for cutting mode, and also the current loop gain changing means performs changeover of a current loop gain to the current loop gain for cutting mode, and further the current loop configuration changing means performs changeover so that proportional-plus-integral type current loop processing is carried out. On the other hand, when said operation mode judging means judges that contents of a command indicate a positioning mode, the speed loop gain changing means performs changeover of a speed loop gain to the speed loop gain for positioning mode, and also the current loop gain changing means performs changeover of a current loop gain to the current loop gain for positioning mode, and further the current loop configuration changing means performs changeover so that integral-plus -proportional type current loop processing is carried out.

As described above, a servomotor controller of the present invention previously stores a speed loop gain for cutting mode and a speed loop gain for positioning mode in storing means, judges whether the contents of a program for the machining executed by using a servomotor is a cutting mode or a positioning mode, and when the contents of the machining program indicate the cutting mode as a result of the mode judgment, reads a speed loop gain for cutting mode out of the storing means, performs speed loop processing by using the read-out speed loop gain and generates a current command, and moreover performs proportional-integral current loop processing in accordance with the generated current command and generates a voltage command to a servo amplifier for controlling the servomotor. On the other hand, when the machining program contents indicate a positioning mode, the servomotor controller reads a speed loop gain for positioning mode out of the storing means and moreover, performs integral-proportional current loop processing in accordance with the generated current command and generates a voltage command to the servo amplifier for controlling the servomotor.

Therefore, even when the machining program contents indicate a cutting mode or a positioning mode, speed loop processing and current loop processing corresponding to the mode are applied. Therefore, high-accuracy and stable machining can be realized.

BRIEF DESCRIPTION OF THE DRAWINGS

The above-described other objects and features of the present invention will become more apparent from the following description of embodiments referring to the accompanying drawings.

DETAILED DESCRIPTION OF THE PREFERRED EMBODIMENTS

A servomotor controller of the present invention will be described below by referring to the essential-section block diagram in FIG. 3.

A controller 10 such as a numerical controller (CNC) or the like having a built-in computer inputs a movement command to a digital servo circuit 12 through a shared RAM 11. The digital servo circuit 12 is composed of a controller of a servomotor 14, which is configured by a processor (CPU), ROM, and RAM or the like.

The digital servo circuit 12 performs position loop processing, speed loop processing, and current loop processing in accordance with a movement command received from the controller 10, a position feedback signal Pf and a speed feedback signal vf received from a position/speed detector 15 built in the servomotor 14, and a current feedback signal received from a current detector for detecting a motor driving current and drives the servomotor 14 by using a servo amplifier 13 such as a transistor inverter or the like. In FIG. 3, the position/speed detector 15 is built in the servomotor 14 to detect a position or speed of the servomotor 14. However, the position/speed detector may be mounted to a machine driven by a servomotor 33 and detect a position or speed of the machine.

In case of the present invention:

(1) When the processor (CPU) of the digital servo circuit 12 performs the above described speed loop processing and current loop processing, the controller 10 supplies a positioning-mode code to the digital servo circuit 12 through the shared memory 11 when positioning is performed (that is, when jog feed or manual feed by a manual pulse generator is performed or when automatic operation is performed in accordance with a machining program and a command of the program is a positioning command of "G00". In a case other than the above described case, the controller 10 judges the present mode as a cutting mode.

(2) As a result of the above described judgement:

(2-1) When the contents of the machining program indicate a positioning mode, the controller 10 performs speed loop processing by using a speed loop gain for positioning mode to obtain a current command (torque command). Moreover, the controller 10 performs integral-proportional (I-P) current loop processing in accordance with the obtained current command and a feedback current sent from the servo amplifier to obtain a voltage command to be supplied to the servo amplifier. In the positioning mode, the servomotor may be driven up to an acceleration/deceleration limit at which a torque command is saturated. Therefore, if a speed loop gain is set to a high value, a control loop may be made unstable. Therefore, the speed loop gain is set to a lower value in the positioning mode (particularly in a quick-traverse positioning mode). (2-2) On the other hand, when the contents of the machining program indicate a cutting mode, the controller 10 performs speed loop processing by using a speed loop gain for cutting mode to obtain a current command (torque command). Then, the controller 10 performs proportional-integral (PI) current loop processing in accordance with the obtained current command and a feedback current sent from the servo amplifier to obtain a voltage command to be supplied to the servo amplifier. In the cutting mode, a speed loop gain is determined to a higher value in order to improve the control performance and the machining accuracy.

The loop gain for positioning mode and the loop gain for cutting mode are set as a parameter in a nonvolatile memory in the controller 10 and mode are set as a parameter in a nonvolatile memory in the controller 10 and stored in a RAM of the digital servo circuit 12 through the shared memory 11 at the initialization stage when a power supply is turned on.

Figure 4:
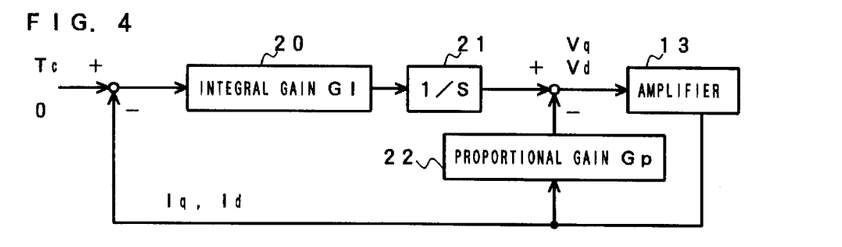
FIG. 4 is a block diagram of a first mode of current loop processing to be executed by a servomotor controller of the present invention.
Figure 5:
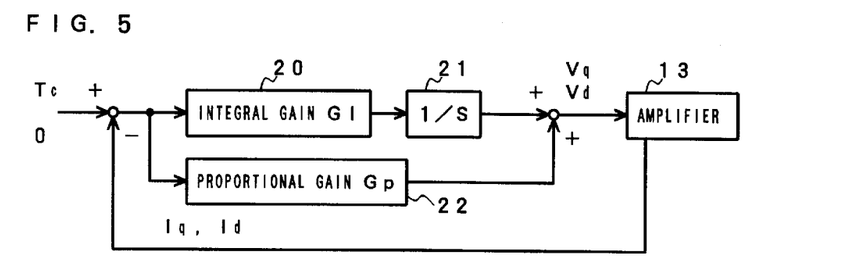
FIG. 5 is a block diagram of a second mode of current loop processing to be executed by a servomotor controller of the present invention.

A block diagram for performing I-P current loop processing is shown in FIG. 4 and a block diagram for performing PI current loop processing is shown in FIG. 5.

In FIGS. 4 and 5, current is controlled through d-q conversion. That is, a d-phase current Id and a q-phase current Iq are obtained by d-q-converting a three-phase motor driving current detected by a current detector. By using the d-phase current Id and q-phase current Iq as feedback currents, a torque command (current command) Tc is obtained through speed loop processing. The obtained torque command Tc is used as a q-phase current command but a d-phase current command is set to zero. Then, current loop processing is performed in accordance with these current commands Tc and 0 to obtain a d-phase voltage command Vd and a q-phase voltage command Vq. Then, these voltage commands Vq and Vd are converted into three-phase voltage commands to drive a servomotor.

In case of the I-P control shown in FIG. 4, a current deviation (=Tc−Iq) is obtained by subtracting a q-phase feedback current Iq from a torque command Tc (that is, q-phase current command) obtained through speed loop processing and multiplying the current deviation by an integral gain Gl in a block 20 and a result of the multiplication is integrated in a block 21. Then, a q-phase voltage command Vq is obtained by subtracting a value (Iq*Gp) obtained by multiplying the q-phase feedback current Iq by a proportional gain Gp from an integral output of the block 21.

Moreover, the same processing is applied to d-phase. That is, a current deviation (=−Id) is obtained by subtracting the d-phase feedback current Id from the d-phase current command (=0), and the current deviation is multiplied by the integral gain Gl in the block 20, and a result of the multiplication is integrated in the block 21. Then, the d-phase voltage command Vd is obtained by subtracting the value (Id*Gp) obtained by multiplying the d-phase feedback current Id by the proportional gain Gp from an integral output of the block 21.

Then, though omitted in FIG. 4, three-phase voltage commands are obtained from two voltage commands Vq and Vd and PWM control is performed by a servo amplifier 13 to control a current of each phase and drive a servomotor.

On the other hand, in case of the PI control shown in FIG. 5, a current deviation (=Tc−Iq) is obtained by subtracting a q-phase feedback current Iq from a torque command Tc (that is, q-phase current command) obtained through speed loop processing. Integral processing for multiplying the current deviation by an integral gain Gl in a block 20 and integrating a result of the multiplication in a block 21 and proportional processing for multiplying the current deviation by a proportional gain Gp in a block 22 are executed and a q-phase voltage command Vq is obtained by adding a result of the integral processing to a result of the proportional processing.

Moreover, the same processing is applied to d-phase. That is, a current deviation (=−Id) is obtained by subtracting a d-phase feedback current Id from a d-phase current command (=0), and integral processing for multiplying the current deviation by an integral gain Gl in the block 20 and integrating a result of the multiplication in the block 21 and proportional processing for multiplying the current deviation by a proportional gain Gp in the block 22 are executed and a d-phase voltage command Vd is obtained by adding a result of the integral processing to a result of the proportional processing.

Then, though omitted in FIG. 5, three-phase voltage commands are obtained from two voltage commands Vq and Vd, and PWM control is performed by a servo amplifier 13 to control a current of each phase and to drive a servomotor.

The PI control is superior in response characteristic as compared with the I-P control, but the PI control has a problem of overshoot or the like. When a current loop is controlled through the PI control in the case where a large current is necessary such as the case of quick traverse in the positioning mode, there is a problem in stability. Therefore, at the time of the positioning mode, current loop processing through the I-P control is performed, instead of the current loop processing through PI control. On the other hand, in the cutting mode (trace control mode such as feed) or the like, current loop processing through the PI control is performed by laying stress on response characteristic.

Figure 1:
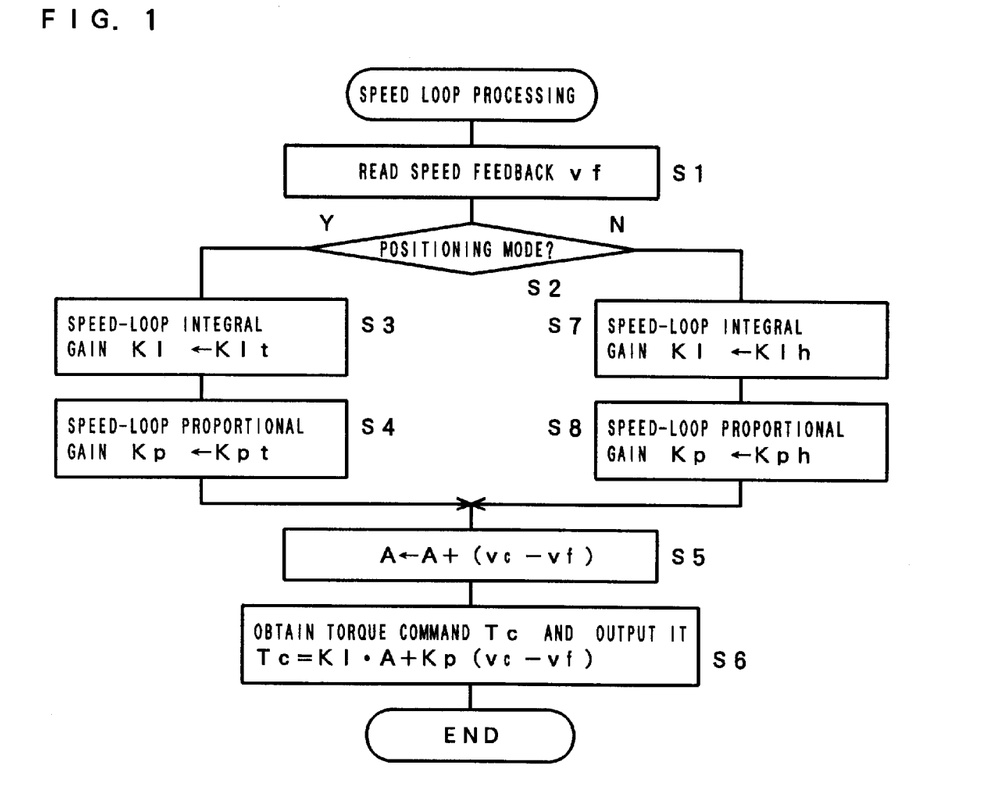
FIG. 1 is a flow chart of speed loop processing to be executed by a servomotor controller of the present invention.
Figure 2:
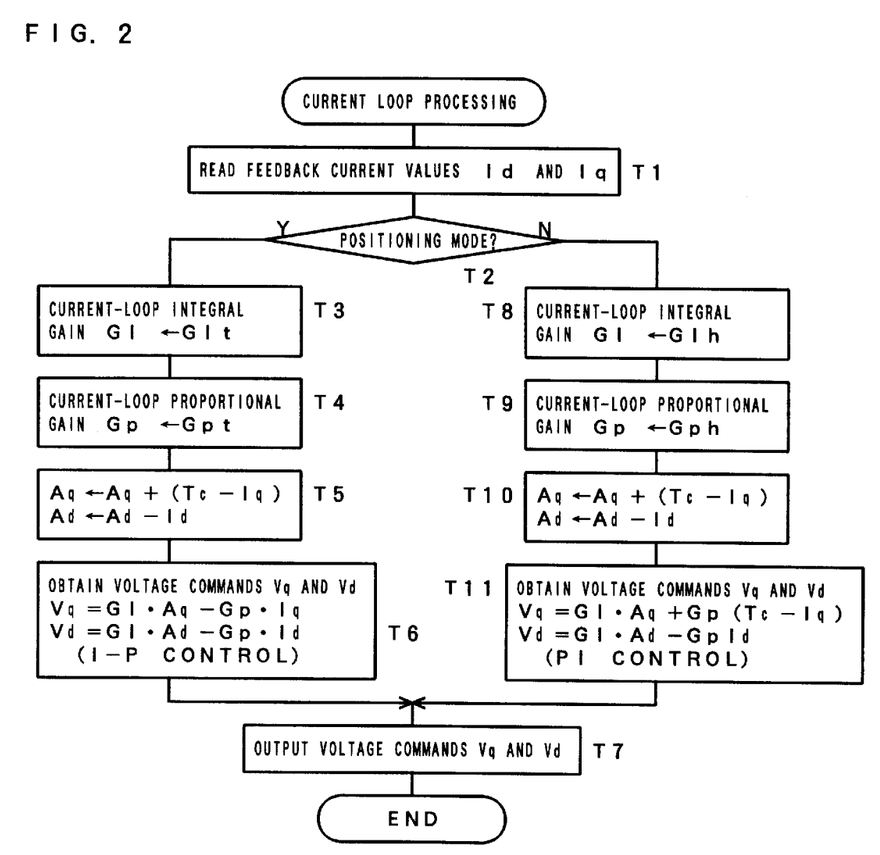
FIG. 2 is a flow chart of current loop processing to be executed by a servomotor controller of the present invention.

Now, speed loop processing and current loop processing to be executed by a processor (CPU) of the digital servo circuit 12 in FIG. 3 every position/speed loop processing cycle will be described below by referring to the flow charts in FIGS. 1 and 2.

First, a speed feedback value vf in the speed loop processing cycle, outputted from the position/speed detector 15, is read (step S1). Moreover, it is judged whether the contents of a machining program indicate a positioning mode or cutting mode in accordance with a supplied mode code (step S2) and when the contents indicate the positioning mode, an integral gain Klt and a proportional gain Kpt for positioning mode are read out of a RAM and set as an integral gain KI and a proportional gain Kp of the speed loop (steps S3 and S4).

Then, integral processing for adding a speed deviation (vc−vf) obtained by subtracting a speed feedback value vf read in step S1 from a speed command vc obtained through position loop processing in a register A serving as an integrator is performed (step S5). Then, a value (Kp*(vc−vf) obtained by multiplying the speed deviation by the proportional gain Kp set in step S4 is added to a value (KI*A) obtained by multiplying an integral value stored in the register A by the integral gain KI set in step S3 to obtain and output a torque command (current command) Tc (step S6) and complete the speed loop processing at this cycle.

On the other hand, when it is judged in step S2 that a machine is not currently operated in the positioning mode (therefore, the machine is currently operated in the cutting mode), an integral gain Klh and a proportional gain Kph of a speed loop for cutting mode stored in a RAM are read out and set as an integral gain Kl and a proportional gain Kp of the speed loop (steps S7 and S8), respectively. Then, the proportional-plus-integral processing in the above described steps S5 and S6 are performed to obtain and output a torque command (current command) Tc (step S6) and complete the speed loop processing at this cycle.

As described above, according to the present invention, when a machine driven by a servomotor is operated in the cutting mode, a torque (current) command is generated by performing speed loop processing by using speed loop gains for cutting mode (speed-loop integral gain Klh and speed-loop proportional gain Kph). Then, proportional-plus-integral type (PI type) current control is performed in accordance with the torque command. On the other hand, when the machine is operated in the positioning mode, a torque (current) command is generated by performing speed loop processing by using speed loop gains for positioning mode (speed-loop integral gain Klt and speed-loop proportional gain Kpt). Then, integral-plus-proportional type (I-P type) control is performed in accordance with this torque command. The speed loop gains (Klh and Kph) for cutting mode are set to be higher than the speed loop gains (Klt and Kpt) for positioning mode.

Figure 3:
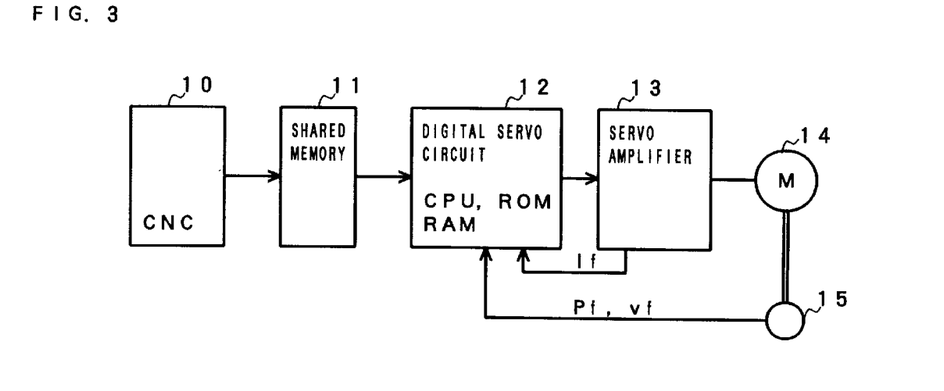
FIG. 3 is a block diagram of an essential section of a servomotor controller of the present invention.

Moreover, the processor (CPU) of the digital servo circuit 12 in FIG. 3 reads d-q-converted d-phase and q-phase feedback current values Id and Iq from a three-phase motor driving current detected by a current detector (step T1). Then, the processor judges whether the contents of a machining program indicate the positioning mode or cutting mode (step T2).

When the contents indicate the positioning mode, the processor reads an integral gain Glt and proportional gain Gpt of a current loop for positioning mode stored in a RAM and sets these gains as an integral gain Gl and a proportional gain Gp of a current loop (steps T3 and T4).

Then, the processor performs q-phase integral processing for adding a current deviation (=Tc−Iq) obtained by subtracting a q-phase feedback current value Iq from the torque command Tc obtained through the speed loop processing (FIG. 1) to a register Aq configuring a q-phase integrator, and d-phase integral processing for adding a current deviation (=−Id) (that is, subtracting a feedback current value Id) obtained by subtracting a d-phase feedback current value Id from a d-phase current command (=0) to a register Ad configuring a d-phase integrator (step T5).

Then, the processor obtains a q-phase voltage command Vq (=Gl*Aq−Gp*Iq) by subtracting a value (Gp*Iq) obtained by multiplying a q-phase feedback current value Iq by the proportional gain Gp set in step T4 from a value (Gl*Aqs) obtained by multiplying an integral value stored in the q-phase register Aq by the integral gain Gl set in step T3. Similarly, the processor obtains a d-phase voltage command Vd (=GI*Ad−Gp*Id) by subtracting a value (Gp*Id) obtained by multiplying the d-phase feedback current value Id by the proportional gain Gp from a value (GI*Ad) obtained by multiplying an integral value stored in the d-phase resister Ad by the integral gain GI (step T6).

The processing between step T3 and step T6 correspond to the block diagram shown in FIG. 4, showing that voltage commands Vq and Vd are obtained by performing I-P current control by using a speed loop gain for positioning mode.

The processor outputs the obtained q-phase and d-phase voltage commands Vq and Vd (step T7), obtains a three-phase-voltage command from the voltage commands vq and Vd similarly to the conventional case, and drives a servo-motor.

On the other hand, when it is judged in step T2 that the contents of the machining program do not indicate any positioning mode (that is, the cutting mode is indicated), the processor reads an integral gain Glh and proportional gain Gph of a current loop for cutting mode stored in RAM and sets these gains as an integral gain Gl and a proportional gain Gp of the current loop (steps T8 and T9).

Next, the processor performs q-phase integral processing for adding a current deviation (=Tc−Iq) obtained by subtracting a q-phase feedback current value Iq from the torque command Tc obtained through the speed loop processing to a register Aq configuring a q-phase integrator and d-phase integral processing for adding a current deviation (=−Id) obtained by subtracting a d-phase feedback current value Id from a d-phase current command (=0) to a register Ad configuring a d-phase integrator (step T10).

Then, the processor obtains a q-phase voltage command Vq (=Gl*Aq+Gp*(Tc−Iq)) by adding a value (Gp*(Tc−Iq)) obtained by multiplying the current deviation (=Tc−Iq) by the proportional gain Gp set in the step T9 to a value (Gl*Aq) obtained by multiplying an integral value stored in the q-phase register Aq by the integral gain Gl set in step T8. Similarly, the processor obtains a d-phase voltage command Vd (=Gl*Aq−Gp*Id) by adding a value (−Gp*Id) obtained by multiplying the current deviation (=−Id) by the proportional gain Gp set in step T9 to a value (Gl*Ad) obtained by multiplying an integral value stored in the d-phase register Ad by the integral gain Gl set in step T8 (step T11).

The processing between the step T8 and the step T11 correspond to the block diagram shown in FIG. 5, showing that voltage commands Vq and Vd are obtained by performing PI current control by using a speed loop gain for cutting mode.

Then, the processor outputs the obtained q-phase and d-phase voltage commands Vq and Vd as commands in the present cycle (step T7), obtains three-phase voltage commands from the voltage commands Vq and Vd similarly to the conventional case, and drives a servomotor to complete the processing at the present cycle.

Next, comparison of machining between a servomotor controller of the present invention and a conventional servomotor controller will be described below with reference to the experimental results shown in FIGS. 7A and 7B.

Figure 7A:
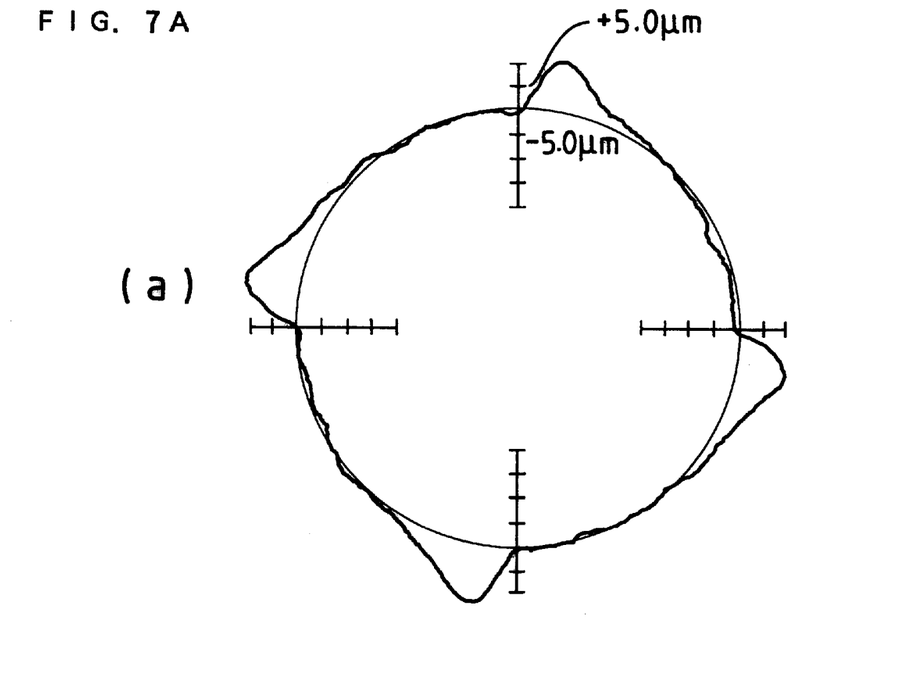
FIG. 7A is an illustration showing a result of circular-arc cutting performed by a conventional servomotor controller.
Figure 7B:
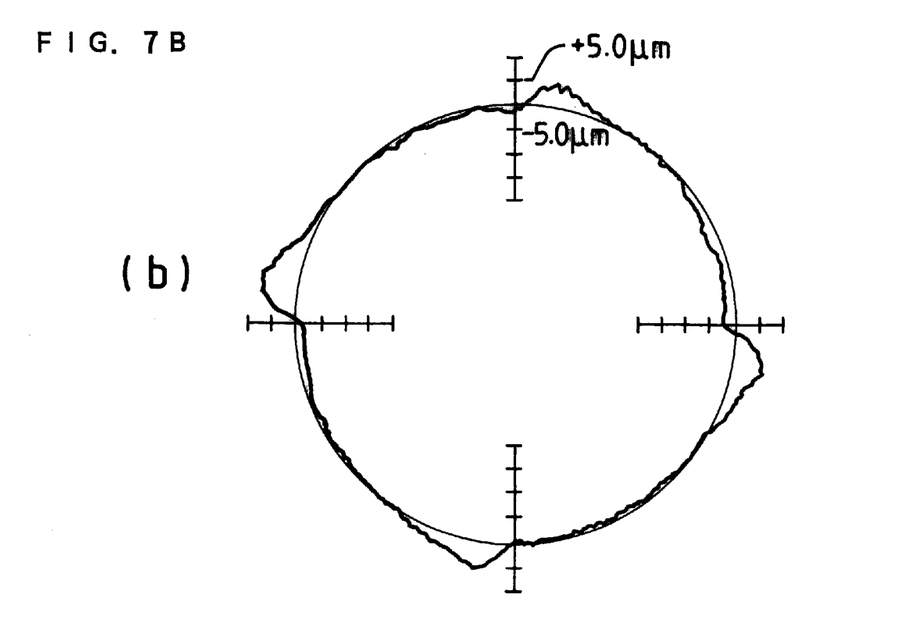
FIG. 7B is an illustration showing a result of circular-arc cutting performed by a servomotor controller of the present invention.

FIGS. 7A and 7B show cutting accuracies when circular-arc cutting with a radius of 10 mm at a speed of 5000 mm/min is performed. FIG. 7A shows a cutting result at the time of performing machining through speed-loop processing and current loop processing by using a speed loop gain and a current loop gain determined by considering only the stability in the quick-traverse operation (positioning mode). On the other hand, FIG. 7B shows a cutting result when machining through speed loop processing and current loop processing is performed by using a speed loop gain and a current loop gain particularly set for cutting mode.

As a result of comparing FIG. 7A (conventional example) with FIG. 7B (present invention), it is found that the machining shown in FIG. 7B performed by changing loop gains is greatly improved in cutting accuracy as compared with the case of FIG. 7A.

What is claimed is:

1. A servomotor controller comprising:
   an operation mode judging unit judging whether the contents of a command indicate a cutting mode or a positioning mode; and
   a speed loop gain storing unit storing a speed loop gain for cutting mode and a speed loop gain for positioning mode, wherein control is performed by selecting either of the speed loop gain for cutting more or the loop gain for positioning mode stored in said speed loop gain storing unit in accordance with a judgment result of said operation mode judging unit.

2. A servomotor controller according to claim 1, further comprising a current loop gain storing unit storing a current loop gain for cutting mode and a current loop gain for positioning mode, wherein control is performed by selecting either of the current loop gain for cutting mode or the current loop gain for positioning mode stored in said current loop gain storing unit in accordance with a judgment result of said operating mode judging unit.

3. A servomotor controller according to claim 1, further comprising a first current control configuration for performing proportional-plus-integral type current loop processing in accordance with a current command generated through speed loop processing and a feedback current fed back from a servo amplifier, and a second current control configuration for performing integral-plus-proportional type current loop processing in accordance with a current command generated through speed loop processing and a feedback current fed back from the servo amplifier, wherein switching from or to the first current control configuration to or from the second current control configuration is performed in accordance with a judgment result of said operation mode judging unit.

4. A servomotor controller according to claim 1 wherein, when said operation mode judging unit judges that contents of a command indicate a cutting mode, said speed loop gain changing means performs changeover of a speed loop gain to the speed loop gain for cutting mode, and also said current loop gain changing unit performs changeover of a current loop gain to the current loop gain for cutting mode, and further said current loop configuration performs changeover so that proportional-plus-integral type current loop processing is carried out, while, when said operation mode judging unit judges that contents of a command indicate a positioning mode, said speed loop gain changing unit performs changeover of a speed loop gain to the speed loop gain for positioning mode, and also said current loop gain changing means performs changeover of a current loop gain to the current loop gain for positioning mode, and further said current loop configuration performs changeover so that integral-plus-proportional type current loop processing is carried out.

5. An apparatus comprising:
   an operation mode judging unit judging whether contents of a command indicate a cutting mode or a positioning mode of a servomotor driven by a servo amplifier; and
   a voltage command generator outputting a voltage command to the servo amplifier, wherein
      if the command is judged to be a cutting mode, then the voltage command is generated by performing proportional plus integral current loop processing,
      if the command is judged to be a positioning mode, then the voltage command is generated by performing integral plus proportional current loop processing.

6. A method of controlling a servomotor driven by a servo amplifier, comprising:
   judging whether a command to the servomotor indicates a cutting mode or a positioning mode;
   if the judged command is cutting, then outputting a voltage command to the servo amplifier by performing proportional plus integral current loop processing,
   if the judged command is positioning, then outputting a voltage command to the servo amplifier by performing integral plus proportional current loop processing.

* * * * *

UNITED STATES PATENT AND TRADEMARK OFFICE
CERTIFICATE OF CORRECTION

PATENT NO. : 6,310,457 B1
DATED : October 30, 2001
INVENTOR(S) : Yasusuke Iwashita et al.

It is certified that error appears in the above-identified patent and that said Letters Patent is hereby corrected as shown below:

<u>Title page,</u>
Item [75], delete "-gun".

<u>Column 1,</u>
Line 45, Not the beginning of a new paragraph.

Signed and Sealed this

Second Day of July, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.     : 6,310,457 B1                                       Page 1 of 1
DATED          : October 30, 2001
INVENTOR(S)    : Yasusuke Iwashita et al.

It is certified that error appears in the above-identified patent and that said Letters Patent is hereby corrected as shown below:

<u>Title page,</u>
Item [73], change "Minamitsuru-gun" to -- Yamanashi --.

Signed and Sealed this

Second Day of September, 2003

JAMES E. ROGAN
*Director of the United States Patent and Trademark Office*